United States Patent [19]

Lohmann et al.

[11] 4,058,480
[45] Nov. 15, 1977

[54] NON-DUSTING, READILY FREE-FLOWING GRANULES OF OPTICAL BRIGHTENERS

[75] Inventors: Frank Lohmann, Arlesheim; Raymond Lugrin, Basel, both of Sweden; Hanspeter Baumann, Toms River, N.J.

[73] Assignee: Ciba-Geigy Corporation, Ardsley, N.Y.

[21] Appl. No.: 505,282

[22] Filed: Sept. 12, 1974

[30] Foreign Application Priority Data

Sept. 14, 1973 Switzerland .................... 13275/73

[51] Int. Cl.² .................... D06L 3/12; C09K 11/00
[52] U.S. Cl. .................... 252/301.21; 252/301.23; 252/301.27
[58] Field of Search ............. 252/301.2 W, 301.3 W, 252/543, 301.21, 301.32, 301.35; 260/240 B, 309.2, 310, 505

[56] References Cited

U.S. PATENT DOCUMENTS

| 2,610,152 | 9/1952 | Ackermann et al. | 252/543 X |
|---|---|---|---|
| 2,654,713 | 10/1953 | Fleck | 252/301.2 W |
| 2,791,564 | 5/1957 | Fleck | 252/301.2 W |
| 3,392,122 | 7/1968 | Obayashi | 252/543 R |
| 3,400,124 | 9/1968 | Okubo et al. | 260/240 |
| 3,485,761 | 12/1969 | Haxby | 252/110 |
| 3,597,364 | 8/1971 | Okubo et al. | 252/301.2 W |
| 3,666,680 | 5/1972 | Briggs | 252/316 |
| 3,772,323 | 11/1973 | Schläpfer | 260/309.2 |
| 3,781,215 | 12/1973 | Langstroth | 252/301.3 W |
| 3,832,310 | 8/1974 | Grand | 252/543 |

FOREIGN PATENT DOCUMENTS

| 703,069 | 8/1967 | Belgium | 252/301.21 |
|---|---|---|---|
| 1,104,441 | 2/1968 | United Kingdom | |
| 1,242,689 | 8/1971 | United Kingdom | |

*Primary Examiner*—T. Tung
*Assistant Examiner*—Aaron Weisstuch
*Attorney, Agent, or Firm*—Edward McC. Roberts; Prabodh I. Almaula

[57] ABSTRACT

New non-dusting, free-flowing readily water-soluble or water-dispersible granules of optical brighteners, and a process for their production are provided.

11 Claims, No Drawings

NON-DUSTING, READILY FREE-FLOWING GRANULES OF OPTICAL BRIGHTENERS

The present invention relates to non-dusting, free-flowing readily water-soluble or water-dispersible granules of optical brighteners, and to processes for their manufacture.

For reasons of work hygiene, facilitation of the work and the demands of process automation, there is increasing interest in having available optical brighteners in non-dusting and readily free-flowing commercial forms which can easily be incorporated into the application medium. Such commercial forms can in some cases, for example, be produced by granulation during spray drying, or in a fluidised bed drier. However, after the drying process a special dust removal operation is frequently necessary and this complicates the process. In many cases, the fact that the products are not easy to granulate is a complicating factor which has then to be compensated by means of special additives. Where active compounds are concerned which are required to be applied in a highly disperse form, the particle size must frequently be reduced to the requisite degree, before drying, by appropriate production methods or by grinding.

It has now been found that non-dusting, readily free-flowing commercial forms of optical brighteners can be obtained, without having to tolerate the disadvantages indicated, if optical brighteners, optionally together with a surface-active agent and/or further auxiliaries, are dissolved in the melt of an organic carrier or several carriers and this melt is then allowed to soidify.

Carriers which can be used are substances which at room temperature are in a solid state and in the melt of which the optical brighteners are satisfactorily soluble. Furthermore, the carrier must be of such character that when the granules are applied the optical brightener enclosed therein is liberated at the desired rate, that is to say the carrier must be soluble in, or miscible with, water or organic solvents. If application in an aqueous medium is intended, it is advantageous to use readily water-soluble substances such as, for example, urea or urea derivatives, ethylene oxide adducts, higher-molecular polyglycols or water-miscible solvents which at room temperature are in a solid form, such as, for example, dimethylsulphone. These carriers can be employed individually or as mixtures with one another. Urea is the preferred carrier material.

Preferably in the case of optical brighteners which are sparingly soluble in water, it is advantageous to add surface-active agents to the melt. As such it is possible to employ both anionic and, in particular, non-ionic compounds.

Anionic surface-active agents are, for example, fatty acids, such as lauric acid, myristic acid, palmitic acid, stearic acid, oleic acid or their mixtures, such as are present, for example, in coconut oil acids and palm kernel oil acids; naphthenic acids; resin acids, such as colophony; also, very diverse sulphates, for example sulphated primary aliphatic alcohols with 10 to 18 carbon atoms, such as sodium decyl-sulphate, lauryl-sulphate, myristyl-sulphate and oleyl-sulphate or sulphated secondary aliphatic alcohols; also, sulphated unsaturated fatty acids, fatty acid ethers or fatty acid amides, sulphated alkylene oxide adducts and sulphated partially esterified polyhydric alcohols; and above all the sulphonates, such as alkylsulphonates, for example laurylsulphonate, cetylsulphonate, stearylsulphonate, petroleum-sulphonates, naphthene-sulphonates, Mersolats, sodium dioctyl-sulphosuccinate and oleylmethyl-tauride (sodium salt), alkylarylsulphonates, such as alkl-benzenesulphonates with a straight-chain or branched alkyl chain with about 7 to 20 carbon atoms, and alkyl-naphthalenesulphonates, such as nonylbenzenesulphonate, dodecylbenzenesulphonate, 1-isopropylnaphthalene-2-sulphonate, di-iso-propylnaphthalenesulphonate, di-n.butylnaphthalene-sulphonate and diisobutylnaphthalenesulphonate, condensation products of naphthalenesulphonic acid and formaldehyde, such as dinaphthylmethanedisulphonate, and also ligninsulphonates, sulphonates of polycarboxylic acid esters and polycarboxylic acid amides and condensation products of fatty acids with aminoalkylsulphonates.

As non-ionic surface-active agents there should above all be mentioned polyglycol ethers, alkyl polyglycol ethers, alkenyl polyglycol ethers, alkylphenyl polyglycol ethers, alkylphenol polyglycol ethers, such as, for example, octylphenol polyglycol ether, fatty acid polyglycol esters, ethoxylated fatty acid sorbitol esters and block polymers of polyethylene oxide and polypropylene oxide.

In addition to these surface-active agents, it is also possible to add yet another auxiliaries, such as, for example, complex-forming agents, for example the sodium salt of ethylenediaminetetraacetic acid, the sodium salt of diethylenetriaminepentaacetic acid, and sodium polyphosphates. Since urea melts tend to eliminate ammonia, it is advantageous to add to the urea melts substances which lead to a lowering of the melting point, for example ammonium nitrate, sodium nitrate or potassium nitrate and thiourea. Water, by itself or mixed with the substances mentioned, can also be employed to lower the melting point. However, in that case it is necessary, before the melt solidifies, to evaporate the water by brief heating to the melting point of the anhydrous melt. This can be done, for example, in a thin layer evaporator. When using urea it is advantageous in many cases, because of the said elimination of ammonia, to add an acid, such as, for example, maleic acid, salicylic acid, benzoic acid, citric acid, malonic acid and the like, to the melt. The addition can be made before beginning the melting process or shortly before solidification.

The optical brighteners which can be used for the present process can belong, with regard to their structure, to the most diverse types and can be water-soluble or water-insoluble, preferably water-soluble. Amongst the large number of suitable types, the following may be mentioned, for example (without thereby expressing a limitation):

a. 4,4'-Bis-(triazinylamino)-stilbene-2,2'-disulphonic acids, for example those of the formula

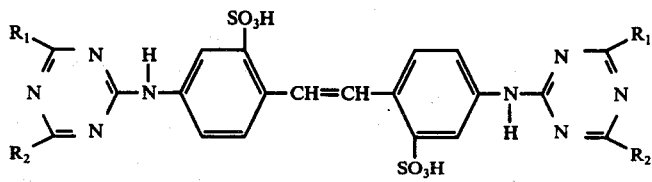

(I)

wherein $R_1$ and $R_2$ denote alkoxy with 1 to 4 carbon atoms, mono- or di-alkylamino with 1 to 4 carbon atoms which are unsubstituted or substituted by hydroxyl or alkoxy with 1 to 4 carbon atoms, anilino which is optionally substituted by 1 or 2 sulpho groups, or morpholino which is optionally substituted by methyl, especially those of the formula

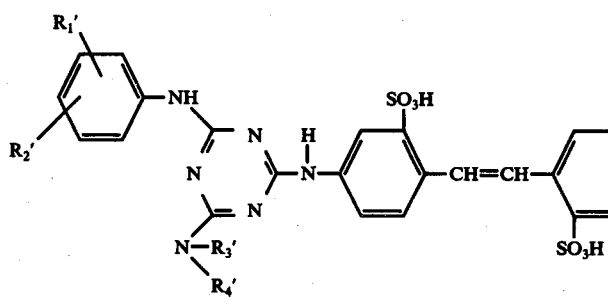

wherein $R_1'$ and $R_2'$ independently of one another denote hydrogen or the sulpho group, $R_3'$ denotes hydrogen, or alkyl or hydroxyalkyl with 1 to 4 carbon atoms and $R_4'$ denotes alkyl or hydroxyalkyl with 1 to 4 carbon atoms, or the sodium, potassium, ammonium or amine salts of these compounds, b. pyrazoline derivatives, for example 1,3-diarylpyrazolines of the formula

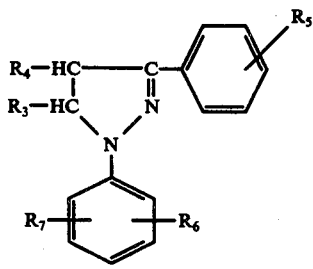

(2)

wherein, for example, $R_3$ denotes hydrogen, alkyl with 1 to 8 carbon atoms or phenyl, $R_4$ denotes hydrogen or alkyl with 1 to 4 carbon atoms or $R_3$ and $R_4$ together denote a fused-on bicycloheptane radical which is unsubstituted or substituted by nitrile, carboxyl, carbomethoxy, carbamoyl or methyl, $R_5$ denotes hydrogen, chlorine or methyl and $R_6$ preferably denotes a sulphonic acid, sulphonamide, alkyl(1–4C)sulphonyl, carboxyl, carbamoyl or carbalk(1–4C) oxy group located in the 4-position and $R_7$ denotes hydrogen, methyl or chlorine, especially those of the formula

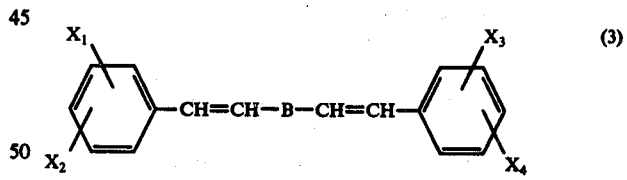

(2a)

or their sodium, potassium, ammonium or amine salts, wherein $R_5'$ denotes alkyl with 1 to 4 carbon atoms or phenyl and $R_6'$ denotes hydrogen, chlorine or methyl, c. distyryl derivatives of the formula, for example those of the formula $$X_1 \quad X_3 \quad (3)$$
$$\text{—CH=CH—B—CH=CH—}$$
$$X_2 \quad X_4$$

wherein, for example, B denotes phenyl or diphenyl which are unsubstituted or substituted by sulphonic acid groups or chlorine, or denotes a naphthalene, dihydrophenanthrene or 3,7-dibenzofurane radical and $X_1$, $X_2$, $X_3$ and $X_4$ independently of one another denote sulpho, sulphamoyl, alkyl(1–4C)sulphonyl, carboxyl, carbalk(1–4C)oxy, chlorine, alkoxy(1–4C), alkyl(1–4C), nitrile or hydrogen, especially those of the formula

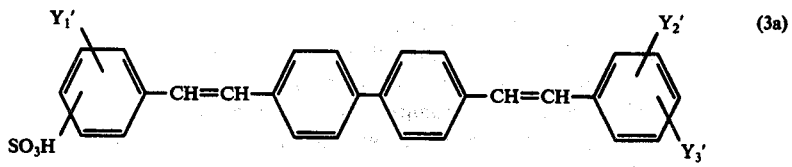

(3a)

or their Na or K salts, wherein $Y_1'$ denotes hydrogen or chlorine, $Y_2'$ denotes hydrogen, chlorine or the sulpho group and $Y_3'$ denotes hydrogen or chlorine, d. benzofuranoylbenzimidazoles, for example those of the formula

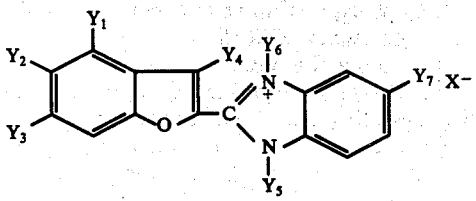

(4)

wherein, for example, $Y_1$ denotes hydrogen, alkyl(1–4 C) or chlorine, $Y_2$ denotes hydrogen, alkyl(1–4 C), alkyl(1–4 C)sulphonyl or chlorine or $Y_1$ and $Y_2$ together denote a fused-on benzene radical, $Y_3$ denotes hydrogen, alkyl(1–4 C) or alkoxy(1–4 C), $Y_4$ denotes hydrogen or methyl, $Y_5$ denotes alkyl(1–4 C), phenyl, cyclohexyl or benzyl, $Y_6$ denotes alkyl(1–2 C) or benzyl, $Y_7$ denotes hydrogen, alkyl(1–4 C), alkoxy(1–4 C), chlorine or alkyl(1–4 C)sulphonyl and X denotes chlorine, an alkyl(1–4 C)sulphonic acid radical or p-toluenesulphonic acid radical, especially those of the formula

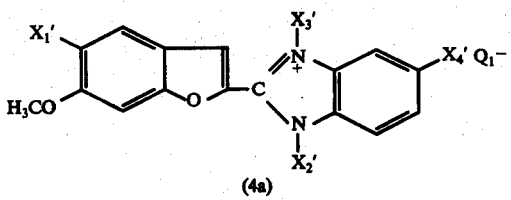

(4a)

wherein $X_1'$ denotes hydrogen or chlorine, $X_2'$ denotes methyl, phenyl or benzyl, $X_3'$ denotes methyl or benzyl, $X_4'$ denotes hydrogen, methyl, methoxy, chlorine, methylsulphonyl or ethylsulphonyl and Q denotes chlorine, the methosulphate radical or the p-toluenesulphonic acid radical, e. bis-(benzoxazol-2-yl) and bis-(benzimidazol-2-yl) derivatives, for example those of the formula

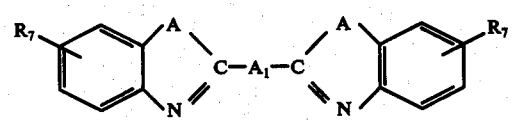

(5)

wherein, for example, $A_1$ denotes —CH=CH—,

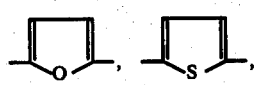

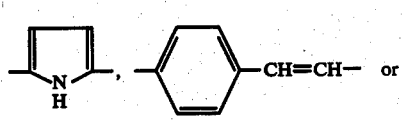

A denotes —O— or —NH— and $R_7$ denotes hydrogen, carboxyl, carbalk(1–4 C)oxy, alkyl(1–4C)sulphonyl, alk(1–4C)oxysulphonyl, the sulphone group or alkyl(1–4 C), f. 4,4'-bis-(azolyl)-stilbene-2,2'-disulphonic acids of the formula

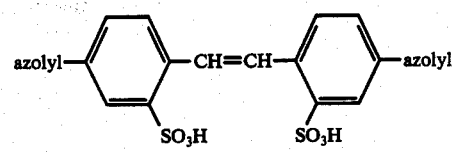

(6)

wherein azolyl represents, for example, the following groupings:

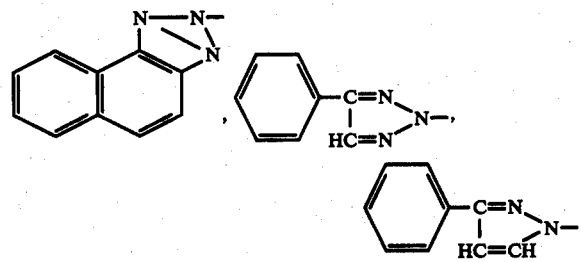

g. stilbyl-naphthotriazoles, for example those of the formula

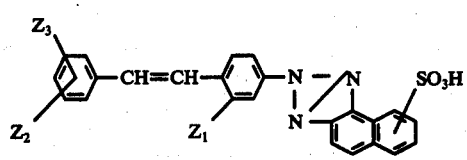

(7)

wherein $Z_1$ denotes, for example, nitrile, sulpho, sulphamoyl, mono- or di-alkyl(1–4 C)sulphamoyl, alkyl(1–4 C)sulphonyl or phenoxysulphonyl and $Z_2$ and $Z_3$ independently of one another denote hydrogen, alkyl(1–4 C) or chlorine, h. monomethine-cyanines, for example those of the formula

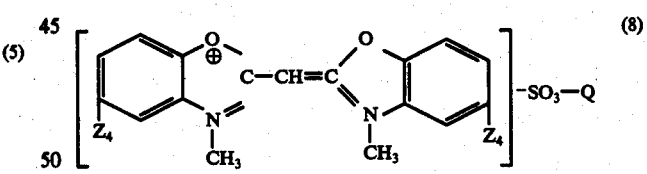

(8)

wherein $Z_4$ denotes, for example, alkyl or alkoxy with 1 to 4 carbon atoms, and Q denotes an aryl or alkoxy(1–4 C) group, i. oxdiazole compounds, for example those of the formula

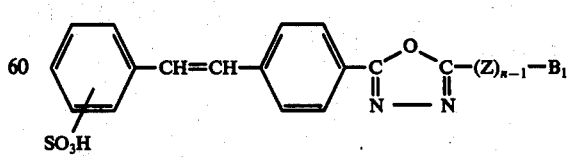

(9)

wherein Z denotes a phenylene, furylene or thienyl radical and $B_1$ denotes an aryl radical and n denotes 1 or 2, and j. coumarin and carbostyryl derivatives.

The term (1–4 C) in connection with an alkyl radical or an alkyl moiety denotes that said radical or moiety is one having 1 to 4 carbon atoms.

A suitable procedure for the actual manufacture of the brightener granules according to the invention is to dissolve the dry brightener and, if relevant, the surface-active agent and the further auxiliaries in a melt of the carrier material and then solidifying this melt in accordance with processes which are in themselves known, in such a way that a free-flowing product which is in the desired particle size and form is produced.

Since the solubility of most brighteners in these melts increases with increasing temperature, the amount of the brightener which can be dissolved can be changed through varying the temperature of the melt. The upper limit of temperature of the melt is of course determined by the heat stability of its components. The temperature at which the components of the melt are brought together can be up to 200° C. In general, however, they are fused together at 100° to 180° C, preferably at 110° to 150° C.

The melt is kept at these temperatures, if necessary whilst stirring, until the components have completely dissolved or dispersed.

The solidification, and conversion of the melt to granules can be carried out, for example, in accordance with the following processes: solidification and scraping off a cooling roller or a cooling belt, melt granulation in a spray tower, or solidification in moulds.

The moulds can be of such dimensions that the mouldings, such as slabs or spheres, are readily pourable and easy to meter.

Instead of dry brighteners it is also possible to start from moist brighteners, such as the brightener press cake. This process should be employed preferentially if it is desired to add water to the melt in order to lower the melting point.

The brightener granules according to the invention are in general composed of: 5 to 70, preferably 8 to 40, percent by weight of optical brightener, 30 to 95, preferably 50 to 90, percent by weight of carrier material, 0 to 15, preferably 0 to 5, percent by weight of acid, 0 to 15, preferably 0 to 5, percent by weight of complex-forming agent, 0 to 15, preferably 0 to 10, percent by weight of surface-active agent unless the latter is employed as a carrier material, and 0 to 15, preferably 0 to 10, percent by weight of other materials, for example acids and/or substances which lower the melting point, such as, for example, thiourea.

The brightener granules according to the invention are solid, non-dusting, free-flowing and very easily and rapidly soluble or dispersible in water, even in cold water. The new brightener granules are particularly suitable for the manufacture of aqueous preparations which can be used for brightening the most diverse materials.

EXAMPLE 1

40 g of the compound of the formula

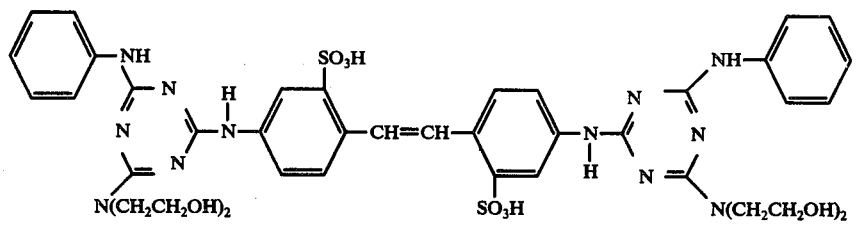

are dissolved at 135° C in a melt of 57 g of urea and 3 g of the sodium salt of ethylenediaminetetraacetic acid. The melt is then poured out onto a metal sheet and allowed to solidify. Before the melt has solidified completely, it is forced through a sieve which gives longish-shaped granules of approximatively 5 mm length. These are non-dusting and very easy to handle and dissolve instantly very easily in water.

EXAMPLE 2

A mixture consisting of 100 g of the compound of the formula

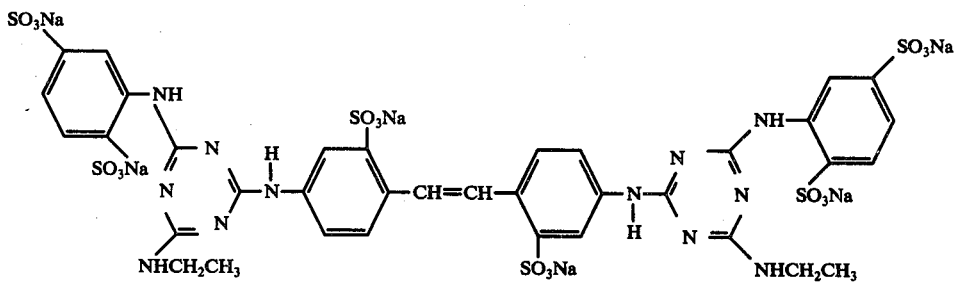

6 g of the sodium salt of ethylenediaminetetraacetic acid and 194 g of urea is warmed to 135° – 140° C. After 15 minutes, a clear melt results, which is caused to solidify on a cooling belt. The product thus obtained wets, and dissolves immediately, in water.

EXAMPLE 3

A mixture consisting of 112 g of the compound of the formula

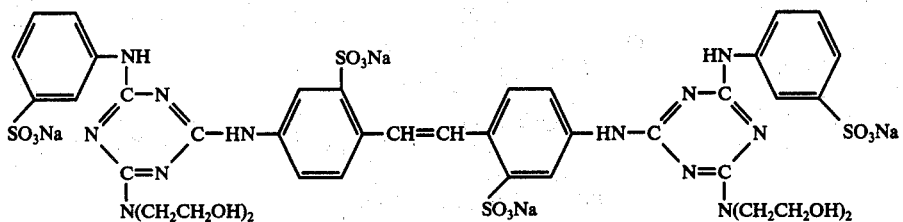

6 g of the sodium salt of ethylenediaminetetraacetic acid and 182 g of urea is warmed to 135° – 140° C and kept at this temperature for 30 minutes. A free-flowing melt is produced, which solidifies on a cooling roller. The scaly product dissolves instantly in water.

EXAMPLE 4

105 g of 1-(p-sulphophenyl)-3-(p-chlorophenyl)-(5-phenyl-$\Delta^2$-pyrazoline (sodium salt) and 6 g of the sodium salt of ethylenediaminetetraacetic acid are introduced at 135° C into a melt of 190 g of urea and the mixture is kept at this temperature for 15 minutes. The melt is then allowed to solidify as a thin layer on a cooling belt. The granules obtained after scraping off the product dissolve rapidly in water.

EXAMPLE 5

1,000 g of the sodium salt of 4,4'-bis-(2-sulphostyryl)-diphenyl are dissolved in a solution of 3,300 g of urea in 1,000 g of water at 90° C. The water contained in the mixture is removed in a thin layer evaporator and at the same time the anhydrous melt which forms is heated to 130° – 135° C. After passing through the thin layer evaporator, the melt is sprayed in a spraying tower and caused to solidify. The practically non-dusting granules thus obtained dissolve rapidly in water.

EXAMPLE 6

1,000 g of the sodium salt of 4-(2-sulphostyryl)-4'-(2-chlorostyryl)-diphenyl are dissolved at 135° C in a melt of 5,400 g of urea, 2,800 g of dimethylsulphone and 800 g of maleic acid. The melt is caused to solidify rapidly on a cooling belt and is then scraped off.

The product thus obtained, after introduction into water, gives a finely divided dispersion of the brightener.

EXAMPLE 7

20 g of 1-benzyl-2-(6-methoxybenzofuran-2-yl)-3-methyl-benzimidazolium methosulphate are dissolved at 120° to 125° C in a mixture of 70 g of urea and 10 g of maleic acid and the melt is then brought to a finely divided, readily free-flowing form by spraying in a spray tower with appropriate supply of cold air, causing rapid solidification. The product wets immediately in water, liberating the active compound in a dissolved or finely disperse form, depending on its concentration and on the pH of the solution.

EXAMPLE 8

200 g of 1-benzyl-2-(6-methoxybenzofuran-2-yl)-methyl-benzimidazolium methosulphate are dissolved in 800 g of dimethylsulphone at 115° C. The melt is then allowed to solidify on a cooling roller and the product is scraped off.

EXAMPLE 9

20 g of 1,2-bis-[5-methylbenzoxazolyl-(2)]-ethylene are dissolved at 180° C in a mixture of 70 g of dimethylsulphone and 10 g of a condensation product of nonylphenol with 35 mols of ethylene oxide.

Thereafter, the melt is allowed to solidify rapidly as a thin layer on a cooling belt and the solidified material is then scraped off. The product thus obtained is readily wettable in water and dissolves, liberating the brightener in a highly disperse form.

EXAMPLE 10

30 g of 1-benzyl-2-(6-methoxybenzofuran-2-yl)-benzimidazole are dissolved at 110° C in 170 g of a melt of a block polymer of propylene oxide and ethylene oxide which contains 80% of ethylene oxide and has a molecular weight of about 8,500. The melt is then allowed to solidify rapidly in a thin layer on a cooling belt and the solidified material is then scraped off. On dissolving the product in water, the active compound is liberated in a highly disperse form. The dispersion thus obtained can be stabilised in a known manner by addition of anionic dispersing agents.

What we claim is:

1. Non-dusting, readily free-flowing, easily soluble granules, consisting of a mixture of
   a. 5 to 70 percent by weight of an optical brightener selected from the group consisting of compounds of the formulae

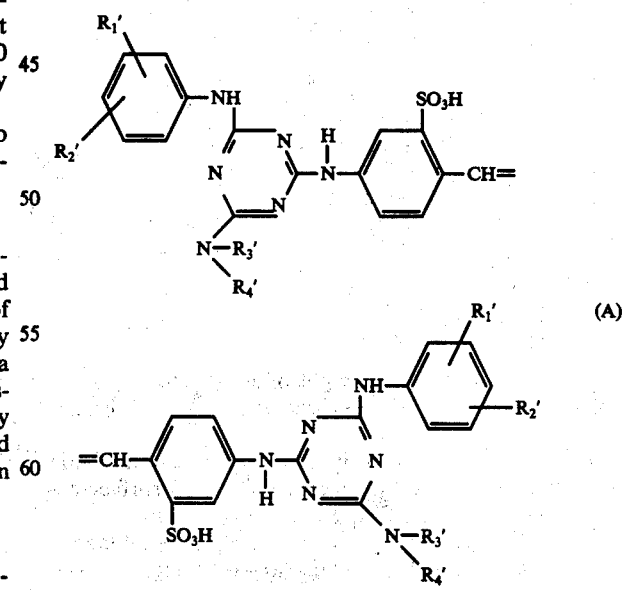

or its sodium, potassium, ammonium or amine salts, wherein $R_1'$ and $R_2'$ independently of one another denote hydrogen or the sulpho group, $R_3'$ denotes hydrogen, alkyl or hydroxyalkyl with 1 to 4 carbon atoms and $R_4'$ denotes alkyl or hydroxyalkyl with 1 to 4 carbon atoms,

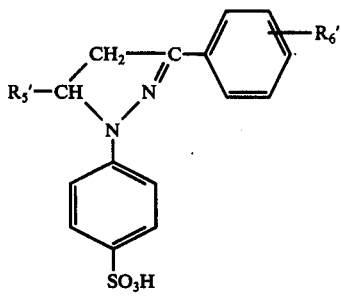
(B)

or its sodium, potassium, ammonium or amine salts, wherein $R_5'$ denotes alkyl with 1 to 4 carbon atoms or phenyl and $R_6'$ denotes hydrogen, chlorine or methyl,

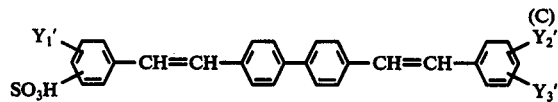
(C)

or its sodium or potassium salts, wherein $Y_1'$ denotes hydrogen or chlorine, $Y_2'$ denotes hydrogen, chlorine or the sulpho group and $Y_3'$ denotes hydrogen or chlorine,

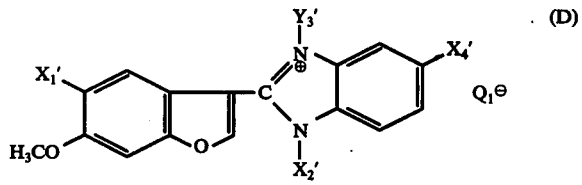
(D)

wherein $X_1'$ denotes hydrogen or chlorine, $X_2'$ denotes methyl, phenyl or benzyl, $X_3'$ denotes methyl or benzyl, $X_4'$ denotes hydrogen, chlorine, methyl, methoxy, methylsulphonyl or ethylsulphonyl and $Q_1$ denotes chlorine, the methosulphate or the p-toluenesulphonic acid radical, b. 0 to 15 percent by weight of an organic acid, c. 0 to 15 percent by weight of a complex-forming agent, d. 0 to 15 percent by weight of an anionic or nonionic surface-active agent except when said surface-active agent is used as carrier material, and e. 0 to 15 percent by weight of a melting point lowering substance, components (a) – (e) being dissolved in a solid melt of f. 95 to 30 percent by weight of an organic carrier material which is solid at room temperature and is soluble in water, selected from the group consisting of urea, a urea derivative, an ethylene oxide adduct, a block polymer of polyethylene oxide and polypropylene oxide, a high-molecular weight polyglycol or dimethylsulphone or mixtures thereof.

2. The non-dusting, readily free-flowing, easily soluble granules of claim 1, consisting of a. 8 to 40 percent by weight of the optical brightener of claim 1, b. 0 to 5 percent by weight of the organic acid, c. 0 to 5 percent by weight of the complex-forming agent, d. 0 to 10 percent by weight of the surface-active agent except when used as carrier material, and e. 0 to 10 percent by weight of the melting point lowering substance dissolved in a solid melt of f. 50 to 90 percent by weight of the organic carrier material.

3. The non-dusting, readily free-flowing, easily soluble granules of optical brighteners of claim 1, wherein the carrier is an ethylene oxide adduct, dimethylsulphone, or both ethylene oxide and dimethylsulphone.

4. The non-dusting, readily free-flowing, easily soluble granules of optical brighteners of claim 1, wherein the carrier is a block polymer of polyethylene oxide and polypropylene oxide.

5. The non-dusting, readily free-flowing, easily soluble granules of optical brighteners of claim 1, wherein the carrier is urea or a urea derivative and the granules also contain an organic acid, a complex-forming agent, or both an organic acid and a complex-forming agent.

6. Non-dusting, readily free-flowing, easily soluble granules of optical brighteners as claimed in claim 5, wherein the sodium salt of ethylenediaminetetraacetic acid is the complex-forming agent.

7. Non-dusting, readily free-flowing, easily soluble granules of optical brighteners as claimed in claim 6, wherein maleic acid is the organic acid.

8. Non-dusting, readily free-flowing, easily soluble granules of optical brighteners as claimed in claim 7, wherein a compound of the formula

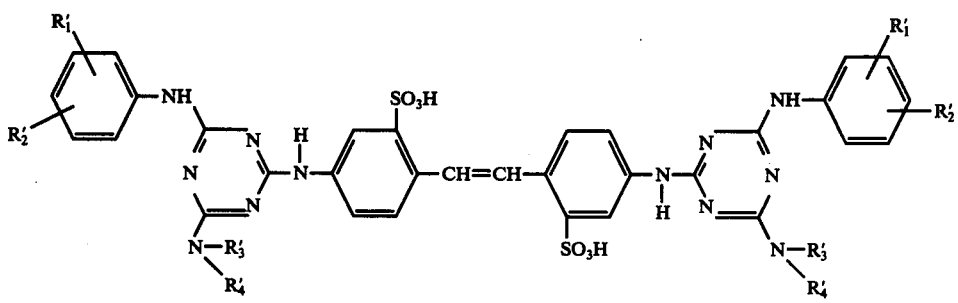

or its sodium, potassium, ammonium or amine salts, wherein $R_1'$ and $R_2'$ independently of one another denote hydrogen or the sulpho group, $R_3'$ denotes hydrogen, alkyl or hydroxyalkyl with 1 to 4 carbon atoms and $R_4'$ denotes alkyl or hydroxyalkyl with 1 to 4 carbon atoms is the optical brightener.

9. Non-dusting, readily free-flowing, easily soluble granules of optical brighteners as claimed in claim 7, wherein a compound of the formula

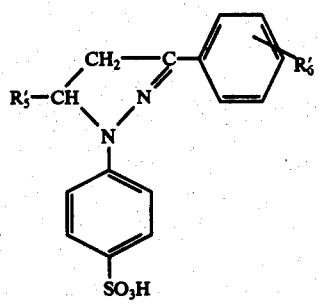

or its sodium, potassium, ammonium or amine salts, wherein $R_5'$ denotes alkyl with 1 to 4 carbon atoms or phenyl and $R_6'$ denotes hydrogen, chlorine or methyl is the optical brightener.

10. Non-dusting, readily free-flowing, easily soluble granules of optical brighteners as claimed in claim 7, wherein a compound of the formula

or its sodium or potassium salts, wherein $Y_1'$ denotes hydrogen or chlorine, $Y_2'$ denotes hydrogen, chlorine or the sulpho group and $Y_3'$ denotes hydrogen or chlorine is the optical brightener.

11. Non-dusting, readily free-flowing, easily soluble granules of optical brighteners as claimed in claim 7, wherein a compound of the formula

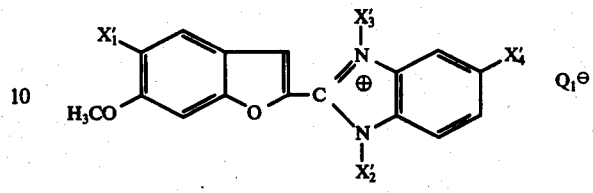

wherein $X_1'$ denotes hydrogen or chlorine, $X_2'$ denotes methyl, phenyl or benzyl, $X_3'$ denotes methyl or benzyl, $X_4'$ denotes hydrogen, chlorine, methyl, methoxy, methylsulphonyl or ethylsulphonyl and $Q_1$ denotes chlorine, the methosulphate or the p-toluenesulphonic acid radical is the optical brightener.

* * * * *